(12) United States Patent
Hanisch

(10) Patent No.: US 11,761,404 B2
(45) Date of Patent: Sep. 19, 2023

(54) MOTOR VEHICLE COMPRISING A WATER PROVISION UNIT AND METHOD FOR OPERATING A MOTOR VEHICLE

(71) Applicant: AUDI AG, Ingolstadt (DE)

(72) Inventor: Thomas Hanisch, Dollnstein (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/641,629

(22) PCT Filed: Sep. 15, 2020

(86) PCT No.: PCT/EP2020/075688
§ 371 (c)(1),
(2) Date: Mar. 9, 2022

(87) PCT Pub. No.: WO2021/052920
PCT Pub. Date: Mar. 25, 2021

(65) Prior Publication Data
US 2022/0397081 A1 Dec. 15, 2022

(30) Foreign Application Priority Data
Sep. 16, 2019 (DE) .......................... 102019124791.8

(51) Int. Cl.
*F02M 25/022* (2006.01)
*F02M 25/025* (2006.01)

(52) U.S. Cl.
CPC ...... *F02M 25/0224* (2013.01); *F02M 25/025* (2013.01); *F02M 25/0222* (2013.01); *F02M 25/0227* (2013.01)

(58) Field of Classification Search
CPC ........... F02M 25/0224; F02M 25/0222; F02M 25/0227; F02M 25/025; Y02T 10/12; B60S 1/50
See application file for complete search history.

(56) References Cited

U.S. PATENT DOCUMENTS

| | | |
|---|---|---|
| 10,018,156 B1 | 7/2018 | McQuillen et al. |
| 2014/0165948 A1 | 6/2014 | Sekiguchi et al. |
| 2017/0107950 A1 | 4/2017 | Hoegle et al. |
| 2017/0306892 A1 | 10/2017 | Kraemer et al. |
| 2018/0051658 A1 | 2/2018 | Miller et al. |
| 2018/0274488 A1 | 9/2018 | Martin et al. |

FOREIGN PATENT DOCUMENTS

| | | |
|---|---|---|
| CN | 104005819 A | 8/2014 |
| DE | 102014100307 A1 | 7/2014 |

(Continued)

OTHER PUBLICATIONS

Examination Report dated Aug. 11, 2020, in connection with corresponding German Application No. 102019124791.8 (10 pp., including machine-generated English translation).

(Continued)

*Primary Examiner* — Hung Q Nguyen
(74) *Attorney, Agent, or Firm* — Maier & Maier, PLLC

(57) ABSTRACT

A motor vehicle including a water provision unit for providing water to at least one water consumer. Here, a water collection tank, a primary water tank and at least one secondary water tank are provided. The water collection tank is or can be fluidically connected to a water source and the primary water tank, bypassing the water collection tank and the secondary water tank, is fluidically connected to the at least one water consumer. The water collection tank is fluidically connected both directly and indirectly via the at least one secondary water tank to the primary water tank, and the water provision unit includes a water conveying unit which is provided and designed for conveying the water out of the water collection tank in direction of the primary water tank by a gaseous conveying medium.

20 Claims, 2 Drawing Sheets

(56) References Cited

FOREIGN PATENT DOCUMENTS

| | | | |
|---|---|---|---|
| DE | 102014222467 A1 * | 5/2016 | ......... F02M 25/0222 |
| DE | 102015220326 A1 * | 4/2017 | ............. F02B 47/02 |
| DE | 102016205103 A1 | 10/2017 | |
| DE | 102016205145 A1 * | 10/2017 | ............. F02B 47/02 |
| DE | 102016205666 A1 | 10/2017 | |
| DE | 102016218274 A1 | 3/2018 | |
| DE | 102017202430 A1 | 8/2018 | |
| DE | 102017210487 A1 | 12/2018 | |
| DE | 102017215751 A1 * | 3/2019 | ......... F02M 25/0221 |
| DE | 102017215751 A1 | 3/2019 | |
| DE | 102018201564 A1 | 8/2019 | |
| DE | 102019105194 A1 | 9/2019 | |
| FR | 2560567 A1 * | 9/1985 | |

OTHER PUBLICATIONS

Examination Report dated Oct. 8, 2020, in connection with corresponding German Application No. 102019124791.8 (6 pp., including machine-generated English translation).

International Preliminary Report on Patentability with English translation dated Mar. 15, 2022 in corresponding International Application No. PCT/EP2020/075688; 17 pages.

International Search Report with English translation dated Nov. 6, 2020 in corresponding International Application No. PCT/EP2020/075688; 7 pages.

\* cited by examiner

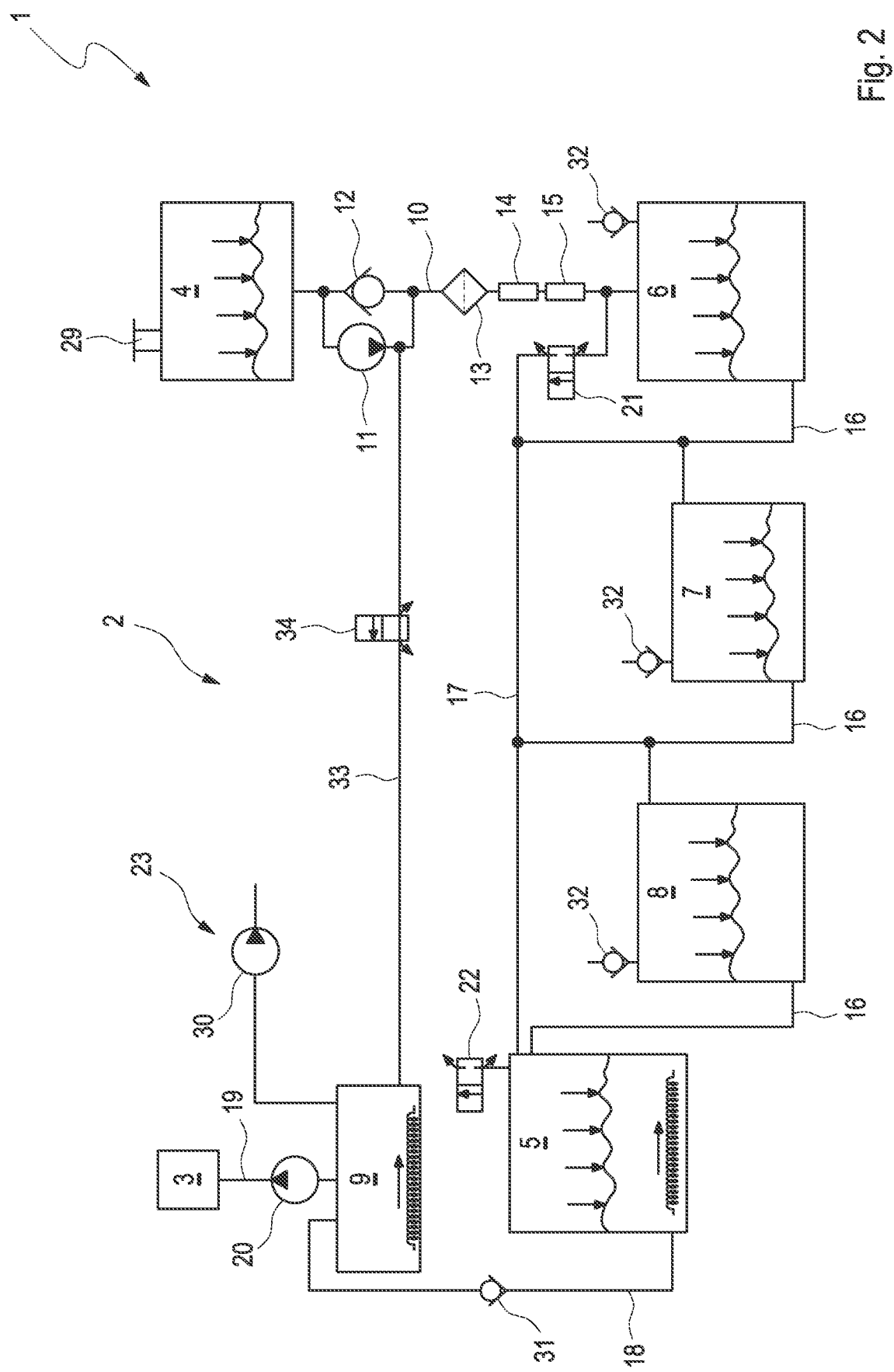

US 11,761,404 B2

MOTOR VEHICLE COMPRISING A WATER PROVISION UNIT AND METHOD FOR OPERATING A MOTOR VEHICLE

FIELD

The invention relates to a motor vehicle comprising a water provision unit for providing water to at least one water consumer. The invention moreover relates to a method for operating a motor vehicle.

BACKGROUND

From the prior art, for example, published document U.S. Pat. No. 10,018,156 B1 is known. This document describes a method and a unit for injecting water into an internal combustion engine.

Published document US 2014/0 165 948 A1 describes an inlet manifold which is suitable for uniformly releasing oil or water from a fluid storage. The inlet manifold comprises an introduction section for introducing air into a combustion chamber of an engine, a fluid storage arranged under the introduction section for holding available a fluid medium, a differential pressure tank comprising a first chamber, a second chamber and a differential pressure valve for controlling a throughflow from the second chamber into the first chamber, a return line which allows the fluid medium collected in the fluid storage to flow out of the fluid storage to reach the first chamber again if the pressure in the second chamber is greater than the pressure in the first chamber, and an exhaust gas line for releasing the fluid medium flowing from the first chamber into the second chamber into the introduction section if the pressure in the second chamber is lower than the pressure in the first chamber.

Moreover, from the prior art, published document DE 10 2019 105 194 A1 is known. It describes a method and a system for water use on board a vehicle. Here, methods for optimizing the use of water recovered or generated on board a vehicle are provided. The quantity of water selected for injection or spraying purposes as well as a sequence of the water injection in response to different vehicle operating conditions are varied on the basis of the water quantity to be fed and on the basis of a current water level with respect to a predicted future water level. The method enables water use advantages to be maximized, particularly if water availability is limited.

SUMMARY

The problem of the invention is to propose a motor vehicle comprising a water provision unit, which has advantages in comparison to known motor vehicles, and which in particular enables a particularly reliable provision of the water with simultaneously flexible arrangement of the tanks of the motor vehicle.

This is achieved according to the invention with a motor vehicle characterized by a water collection tank, by a primary water tank and by at least one secondary water tank, wherein the water collection tank is or can be fluidically connected to a water source, and the primary water tank, bypassing the water collection tank and the secondary water tank, is fluidically connected to the at least one water consumer, wherein the water collection tank is both directly and also indirectly fluidically connected via the at least one secondary water tank to the primary water tank, and wherein the water provision unit comprises a water conveying unit which is provided and designed for conveying the water out of the water collection tank in direction of the primary water tank by means of a gaseous conveying medium.

The motor vehicle comprises the water provision unit and the at least one water consumer. In principle, any number of water consumers can be present, for example, only a one water consumer or multiple water consumers can be present. To the extent that, in the context of this description, reference is made only to the water consumer or to the at least one water consumer, the explanations are always analogous. In the case of multiple water consumers, the explanations for the water consumer or for the at least one water consumer are preferably also applicable to multiple water consumers or to each of the water consumers.

The water consumer can in principle have any design. For example, it is in the form of a cleaning system, in particular a windshield washing system. In this case, the water is used for cleaning the motor vehicle, in particular a windshield of the motor vehicle. For this purpose, the water is applied, in particular sprinkled or sprayed, onto a surface of the motor vehicle, in particular onto the windshield. For this purpose, the water is applied, for example, via at least one nozzle or the like. For example, the water is mixed with a cleaning agent and/or a frost protection agent before it is applied.

However, the water consumer is particularly preferably a water injection of a drive unit of the motor vehicle. The drive unit is used for driving the motor vehicle and to that extent for providing a drive torque for driving the motor vehicle. The drive unit comprises at least one drive device which is preferably in the form of an internal combustion engine. The internal combustion engine has at least one combustion chamber, in which fuel together with oxygen is burned. In order to increase the power and/or the efficiency of the drive unit and/or in order to cool said drive unit, it is provided in the context of the water injection to supply the water at least from time to time to the internal combustion engine, in particular to the combustion chamber.

For example, the water is introduced here directly or only indirectly, for example, via a suction pipe of the internal combustion engine, into the combustion chamber. In the latter case, for example, an injection nozzle through which the water is introduced into the combustion chamber leads directly into the combustion chamber. In the case of direct introduction, the injection nozzle leads, for example, into the suction pipe of the internal combustion engine, pipe which is fluidically connected to the combustion chamber via at least one gas exchange valve, in particular an inlet valve. When the gas exchange valve is open, the water injected into the suction pipe together with the fresh gas in this respect flows into the combustion chamber.

Usually, it is provided that water is supplied from time to time to the water provision unit by a user of the motor vehicle. In today's motor vehicles, this is associated with some effort. Thus usually, first the engine compartment and subsequently a storage container for the water must be opened and then, through a filling opening, the water can be filled into the storage container, for example, with the help of a water can or the like. In particular in the case of the design of the at least one water consumer as cleaning unit, optionally the cleaning agent and/or the frost protection agent is/are moreover mixed with the water. This requires additional work steps.

It is only thereafter that the storage container and the engine compartment are closed again and the water consumer can be used. The storage container must be arranged accordingly in the engine compartment of the motor vehicle and have a volume which allows the use of the water consumer over a reasonable time period. This means that the installation space used for the storage container in the engine compartment is not available for other purposes, in particular since the storage container should be fillable by the user and at the same time must have a sufficient size.

For this reason, according to the invention, the water collection tank, the primary water tank and the secondary water tank are part of the motor vehicle. The water collection tank, in terms of its design, corresponds mostly to the storage container, namely to the extent that it is or can be fluidically connected to the water source. For example, water can thus be manually supplied to the water collection tank by the user. Particularly preferably, for this purpose, the water collection tank comprises a standardized interface which can be connected by means of a hose coupling. Here, as an example, one can use, for example, a standardized hose coupling as is conventional in the house and garden sector. The water source in this case is, for example, a water tap or the like.

Additionally or alternatively, as water source, an on-board water source of the motor vehicle is used. Such an on-board water source is, for example, a collection unit for surface water, in particular rain water which hits the motor vehicle from an outside environment of the motor vehicle. It can also be a collection unit for condensate arising on or in the motor vehicle. The collection unit is provided and designed in particular for collecting condensate which arises during an operation of an optional air conditioning system of the motor vehicle. However, the condensate can also be obtained from exhaust gas of the drive unit. Additionally or alternatively, process water, for example, process water of a hydrogen drive, is collected and supplied to the water collection tank.

Here, the water collection tank is at first only for receiving the water and not, for example, for stocking the water until it is needed by the water consumer. Instead, water is rapidly conveyed further from the water collection tank, namely into the primary water tank and/or into the secondary water tank and/or into a working water tank. In particular, if the water source is present as on-board water source, the volume of the water collection tank with respect to the conventional storage container can be considerably reduced. For example, the water collection tank has a volume of at most 5 L, at most 2.5 L, at most 2 L, at most 1.5 L or at most 1 L.

The primary water tank is used for providing water to the at least one water consumer. Accordingly, it is fluidically connected to the water consumer in such a manner that the water present in the primary water tank can be supplied directly, that is to say not via the water collection tank and the secondary water tank, to the water consumer. The fluidic connection between the primary water tank and the water consumer thus does not run via the water collection tank and the secondary water tank, but instead bypasses them. The primary water tank has, for example, a similar volume to that of the water collection tank, in particular the same volume. For example, the volume of the primary water tank is at most 10 L, at most 7.5 L, at most 5 L or at most 2.5 L.

In addition to the water collection tank and the primary water tank, the motor vehicle also has the at least one secondary water tank. This means that exactly one secondary water tank or multiple secondary water tanks can be provided. If, in the context of this description, reference is made to the secondary water tank or the at least one secondary water tank, the explanations always have the same meaning. In the case of multiple secondary water tanks, the explanations for the secondary water tank or the at least one secondary water tank can always preferably be applied to several of the secondary water tanks or to each of the secondary water tanks. The secondary water tank increases the storage volume available for the water. For example, the secondary water tank has a volume of at most 10 L, at most 7.5 L, at most 5 L or at most 2.5 L.

The primary water tank and in particular the secondary water tank are preferably arranged in a structural component or a body component of the motor vehicle. For example, the primary water tank and/or the secondary water tank is/are located in a strut of the motor vehicle or the like, that is to say is/are surrounded at least peripherally, at least in some areas, by a load bearing component of the motor vehicle which is preferably made of metal. Thereby, a particularly high space efficiency can be achieved with at the same time simple refillability. For this purpose, the water collection tank, analogously to the storage container, can continue to be present in the engine compartment of the motor vehicle but can be designed with a relatively small volume.

In order to ensure a particularly rapid provision of the water, the water collection tank is fluidically connected directly to the primary water tank. The water present in the water collection tank in this respect is supplied at least from time to time, bypassing the secondary water tank, to the primary water tank. In order to make the storage volume of the secondary water tank nonetheless usable, the water collection tank is additionally fluidically connected via the at least one secondary water tank to the primary water tank. At least from time to time, water is thus supplied from the water collection tank to the secondary water tank, in particular via the secondary water tank to the primary water tank.

If multiple secondary water tanks are present, they are preferably fluidically connected in series to one another, and thus the water collection tank is fluidically connected via a series connection of multiple secondary water tanks to the primary water tank. Thereby, the secondary water tanks, when considered individually, can have a low volume, but considered overall, they provide a large storage volume for water.

In addition, particularly preferably, at least two of the multiple secondary water tanks are fluidically connected parallel to one another. This means that the secondary water tanks are thus not only fluidically connected in series but they are also additionally present in parallel connection with respect to one another. Thereby, a particularly reliable water supply of the primary water tank with water from the water collection tank is ensured, in particular there is little pressure loss in the fluidic connection between the water collection tank and the primary water tank via the at least one secondary water tank, since, due to the additional parallel connection of the secondary water tanks, the water does not necessarily have to flow through each of the secondary water tanks to reach the primary water tank from the water collection tank. Instead, here the water can fluidically bypass one or more of the secondary water tanks.

Since, in the end, the primary water tank is used to directly provide the water to the water consumer, a conveying of the water between the water collection tank and the primary water tank, in particular via the at least one secondary water tank, with only a relatively low conveying mass flow, is necessary. For example, from time to time a certain extraction mass flow of water is supplied to the water consumer, in particular from the primary water tank. However, the conveying of the water from the water collection tank into the primary water tank, in particular via the secondary water tank, occurs with a lower conveying mass flow which is, for example, at most 75%, at most 50% or at most 25% with respect to the extraction mass flow.

Due to the low conveying mass flow, for conveying the water between the individual tanks, a pump is not necessary, so that the conveying of the water from the water collection tank into the primary water tank, in particular via the secondary water tank, occurs from time to time without pump, namely by means of the water conveying unit which conveys the water with the help of the gaseous conveying medium. This should be understood to mean that an overpressure is supplied to at least one of the tanks and/or an underpressure is supplied to another of the tanks, wherein the overpressure or the underpressure or their combination brings about the conveying of the water from the water collection tank in direction of the primary water tank.

The described design of the motor vehicle has the advantage that a decentralized storage of the water occurs, namely in the water collection tank, in the primary water tank and in the at least one secondary water tank. The volumes of the individual tanks can therefore be selected to be small in comparison to the volume of the storage containers used to date. In addition, it is not necessary to implement a high conveying mass flow between the tanks, because a sufficient quantity of water for operation according to intended use of the at least one water consumer is held available.

A development of the invention provides that the primary water tank is fluidically connected via an extraction line to the at least one water consumer, extraction line which has a larger line cross section than a connection line via which the at least one secondary water tank is fluidically connected to the water collection tank and/or than a supply line via which the primary water tank is fluidically connected to the at least one secondary water tank.

The extraction line connects the primary water tank to the at least one water consumer. For example, the extraction line leads directly into the primary water tank. However, it can also be provided that the extraction line only indirectly fluidically connects the primary water tank to the water consumer, for example, via a working water tank. In this case, the extraction line is preferably fluidically connected directly to the working water tank, while a fluidic connection between the primary water tank and the working water tank is established via a feed line.

For example, it can be provided that the feed line has the same line cross section as the extraction line. However, its line cross section can also be smaller than the line cross section of the extraction line. The extraction line or the cross section thereof is dimensioned in such a manner that the water can be supplied to the water consumer with the extraction mass flow.

The connection line is fluidically arranged between the water collection tank and the secondary water tank. For example, the connection line, on the one hand, leads directly to the secondary water tank and, on the other hand, it leads directly to the water collection tank. In this respect, water can be supplied from the water collection tank to the secondary water tank via the connection line. It can be provided that the water collection tank is geodetically arranged above the secondary water tank, so that, due to the effect of gravity, the water is pushed from the collection tank through the connection line in direction of the secondary water tank.

In addition to the connection line, the supply line is present, namely fluidically between the at least one secondary water tank and the primary water tank. For example, the supply line leads, on the one hand, into the secondary water tank and, on the other hand, into the primary water tank, so that a direct flow connection between the secondary water tank and the primary water tank is established. If multiple secondary water tanks are present, they are preferably fluidically connected in series via the supply line, wherein exactly one of the secondary water tanks is fluidically connected directly to the primary water tank via the supply line. The additional secondary water tanks are fluidically connected only indirectly, namely via this secondary water tank, to the primary water tank.

Particularly preferably, both the connection line and the supply line each have a smaller line cross section than the extraction line. For example, the diameter of the line cross section in each case is at most 10 mm or at most 7.5 mm, but preferably at most 5 mm or at most 2.5 mm. For example, the line cross section of the connection line corresponds to the line cross section of the supply line. However, in each case, it can be provided that the line cross section of the supply line is greater than the line cross section of the connection line.

However, the line cross section of the connection line is preferably greater than the line cross section of the supply line. In this respect, the water can be supplied more rapidly to the secondary water tank from the water collection tank than the water can be supplied to the primary water tank from the secondary water tank. Thereby, a rapid filling of the water provision unit with water, particularly from an external water source, via the water collection tank is ensured.

Here, particularly preferably, the volume of the secondary water tank which is fluidically connected directly to the water collection tank via the connection line is relatively large. For example, the volume of this secondary water tank is greater by a factor of at least 2, at least 3, at least 4 or at least 5 than the volume of the water collection tank. Such a design of the motor vehicle enables an excellent availability of the water and at the same time a rapid filling with the water.

A development of the invention provides that the primary water tank is fluidically connected via a working water tank to the at least one water consumer. In addition to the water collection tank, the primary water tank and the at least one secondary water tank, in this respect an additional water tank, namely the working water tank, is present. Said working water tank is fluidically arranged between the primary water tank and the water consumer. The water to be supplied to the water consumer is thus not extracted directly from the primary water tank but instead from the working water tank. In other words, the water supplied to the water consumer is held available in the working water tank and supplied to the water consumer from it.

The working water tank is arranged fluidically closer to the water consumer than the primary water tank. For example, it is provided here that the working water tank is directly present at the water consumer or even part thereof. For example, the working water tank has a volume which is at most 0.75, at most 0.5 or at most 0.25 with respect to the volume of the primary water tank. In this case, a space-saving design of the working water tank close to the water consumer is implemented, wherein the availability of the water for the water consumer is substantially ensured by means of the primary water tank. However, it can naturally also be provided that the working water tank has a volume which corresponds to or is even greater than the volume of the primary water tank. In principle, by means of the working water tank, the rapid availability of the water for the water consumer is ensured.

A development of the invention provides that the extraction line leads into the working water tank and the working water tank is fluidically connected to the primary water tank via a feed line which has a smaller line cross section than the extraction line. The extraction line is in this respect directly connected to the working water tank and thus it is only indirectly connected to the primary water tank via the working water tank. Present fluidically between the working water tank and the primary water tank is the feed line via which water is conveyed at least from time to time from the primary water tank into the working water tank.

Since the extraction mass flow for providing the water to the water consumer is ensured with the help of the working water tank, the feed line can have the smaller line cross section in comparison to the extraction line. Alternatively, it can naturally also be provided that the line cross section of the feed line corresponds to the line cross section of the extraction line, in order to ensure the high extraction mass flow for a longer time period. The use of the feed line and of the working water tank in each case enables a particularly flexible arrangement and a compact design of the water provision unit.

A development of the invention provides that the primary water tank and/or the working water tank in each case comprise a heating unit and/or that the water collection tank and/or the at least one secondary water tank in each case is/are designed without heating. The heating unit is used for heating the respective tank or the water present in the respective tank. The heating unit is preferably an electrical heating unit. By means of the heating unit, the frozen water present in the respective tank can be thawed and thus be provided to the water consumer.

Since an operation according to intended use of the water consumer over a certain time period can already be ensured with the help of the primary water tank and/or the working water tank, it is sufficient if only one of these tanks has such a heating unit or if both tanks in each case have such a heating unit. The other tanks, on the other hand, can be without heating, that is to say not unheatable. The described design ensures an energy efficient operation of the motor vehicle.

Additionally or alternatively, it can be provided to supply an additive to at least one of the described tanks, for example, to the primary water tank and/or the working water tank. The additive mixes in the respective tank with the water located therein, so that the water subsequently comprises the additive. The additive can be, for example, a frost protection agent or a cleaning agent. The cleaning agent is used in particular if the water is used for operating the cleaning system, in particular the windshield washer system, of a motor vehicle. The additive can in addition be used to modify at least one property of the water, for example, the hardness. In this case, the additive is a softener or a decalcifier.

A development of the invention provides that in the connection line at least one of the following units is present: filter, ion exchanger, performance sensor and flushing pump, in particular with parallel connected return valve. The at least one of the mentioned devices in this respect is fluidically present between the water collection tank and the secondary water tank. The filter is provided and designed for the purpose of filtering particles or soiling particles from the water arriving from the water collection tank. The ion exchanger is also provided and designed for cleaning the water. The performance sensor, on the other hand, is used for determining a soiling degree and/or a composition of the water. In this respect, the performance sensor can also be referred to as quality sensor. The soiling degree corresponds, for example, to a number of particles in the water per unit of volume. The performance sensor is, for example, an optical or chemical sensor or comprises such a sensor.

Additionally or alternatively, the flushing pump can be present in the connection line. The flushing pump is used for conveying the water from the water collection tank in direction of the primary water tank and/or of the secondary water tank, namely, in particular, with higher mass flow than the water conveying unit. The flushing pump is provided, for example, for a flushing of the water provision unit as part of maintenance of the motor vehicle or the like. A check valve can be connected in parallel to the flushing pump, so that, when the flushing pump is deactivated, water can flow via the connection line from the water collection tank in direction of the primary water tank and/or of the secondary water tank.

For example, all the mentioned units are present in the connection line. In each case, here, in flow direction starting from the water collection tank toward the secondary water tank, the following order is provided: flushing pump, filter, ion exchanger and performance sensor. For example, in the case of a sufficient quality of the water sensed by the performance sensor, said water is supplied to the primary water tank and/or to the secondary water tank. On the other hand, if the water quality is not sufficient, then the water is purged from the water provision unit. Here, the water quality is understood to mean, for example, the soiling degree and/or composition. Overall, a particularly flexible operation of the motor vehicle is thus implemented.

A development of the invention provides for the presence of the direct connection of the water collection tank to the primary water tank via a bypass line which leads, on the one hand, into the primary water tank and, on the other hand, into the water collection tank or the connection line. The bypass line in this respect is used for bypassing the at least one secondary water tank. For example, the bypass line, on its side facing away from the primary water tank, leads into the water collection tank. However, preferably, the bypass line leads into the connection line, namely, preferably, downstream of at least the flushing pump. Particularly preferably, the bypass line leads, downstream of the filter and/or of the ion exchanger and/or of the performance sensor and/or flushing pump, into the connection line.

Particularly preferably, a switching valve is arranged in the bypass line, wherein, in a first switch position of the switching valve, the switching valve opens the bypass line and, in a second switch position, it fluidically interrupts the bypass line. Thus, preferably, in the first switch position of the switching valve, the fluidic connection is present between the primary water tank, on the one hand, and the water collection tank or the connection line, on the other hand, via the bypass line.

It can be provided that the bypass line has a line cross section which corresponds to the line cross section of the supply line. However, the bypass line can also have a larger line cross section in comparison to the supply line. The bypass line and the supply line can in principle lead separately from one another into the primary water tank. However, it can also be provided that the supply line leads upstream of the primary water tank into the bypass line and in this respect runs together with said bypass line to the primary water tank. In each case, with the described design, a high degree of flexibility with simultaneously small space requirement is achieved.

A development of the invention provides that an underpressure pump for conveying the gaseous conveying medium from the primary water tank is fluidically connected to the primary water tank, in particular via the working water tank, and/or that an overpressure provision unit for conveying the gaseous conveying medium in direction of the primary water tank is fluidically connected to the water collection tank. The underpressure pump is used for providing an underpressure; the overpressure provision unit is provided for providing an overpressure. If the underpressure pump is used for conveying the conveying medium, then it is connected to the tanks in such a manner that the water is suctioned starting from the water collection tank in direction of the primary water tank or the working water tank. In the case of the overpressure provision unit, said unit is connected to the tanks in such a manner that the water is pushed from the water collection tank in direction of the primary water tank or the working water tank.

In this respect, the underpressure pump is directly connected to the primary water tank or—if present—to the working water tank and to the additional tanks only via this tank. The overpressure provision unit is fluidically connected at least to the water collection tank and, for example, only indirectly to the additional tanks. However, it can also be provided that the overpressure provision unit is in each case directly connected to multiple tanks, in particular to the water collection tank, to the primary water tank and/or to the at least one secondary water tank. In this case, the tanks can be supplied individually in a targeted manner with the overpressure provided by the overpressure provision unit. Overall, in this way, an effective conveying of the water is implemented.

A development of the invention provides that the water consumer is a water injection of a drive unit of the motor vehicle or a windshield cleaning system of the motor vehicle. Reference has already been made above to such a design of the water consumer. It can be provided that the water provision unit is used both for the provision of water to the water injection and also to the windshield cleaning system. In this case, it can be used in a particularly flexible way.

The invention moreover relates to a method for operating a motor vehicle, in particular a motor vehicle according to the explanations in the context of this description, wherein the motor vehicle has a water provision unit for providing water to at least one water consumer. The method is characterized by a water collection tank, a primary water tank and at least one secondary water tank, wherein the water collection tank is or can be fluidically connected to a water source and the primary water tank, bypassing the water collection tank and the secondary water tank, is fluidically connected to the at least one water consumer, wherein the water collection tank is fluidically connected both directly and also indirectly via the at least one secondary water tank to the primary water tank, and wherein the water provision unit comprises a water conveying unit which conveys at least from time to time water from the water collection tank in direction of the primary water tank by means of a gaseous conveying medium.

Reference has already been made to the advantages of such a design of the motor vehicle or of such a procedure. Both the motor vehicle and the method for the operation thereof can be developed according to the explanations in the context of this description, so that in this respect reference is made to said explanations.

A development of the invention provides that, when the motor vehicle is parked, which entails in particular a deactivation of the drive unit, a weather forecast is queried or generated. Depending on the weather forecast, a delivery of water occurs from at least one of the lines of the water provision unit. If, for example, in the context of the weather forecast, it is determined that there is a risk of frost, then the water is delivered from the at least one line, in particular from all the lines. On the other hand, if there is no risk of frost, then this can be omitted. Naturally, the delivery of the water from the at least one line or from all the lines can, for safety reasons, also be carried out each time the motor vehicle is parked.

A development of the invention provides that, when an external water source is connected to the water collection tank, a filling operation of the water provision unit occurs. During this filling operation, the water provision unit is operated in such a manner that all the available tanks are filled with the water provided by the external water source, in particular completely filled. For example, this occurs in such a manner that first the primary water tank is filled and—if present—the working water tank is filled. It is only thereafter that the filling of the at least one secondary water tank occurs. Thereby, a rapid startup of the motor vehicle and a rapid availability of the water for the water consumer are implemented.

Additionally or alternatively, when the external water source is connected to the water collection tank, a flushing operation or cleaning operation of the water provision unit is carried out. During said operation, all the tanks of the water provision unit are flushed with the externally provided water and subsequently the water is extracted again. For example, the water flows through all the tanks from the water collection tank to the primary water tank or the working water tank and is purged therefrom. During the throughflow through the tanks, the water takes on contaminants with, for example, soiling particles and/or microorganisms, so that they are delivered out of the water provision unit. The externally provided water can—in the case of the cleaning operation—be mixed with a cleaning agent. During flushing operation, on the other hand, water without cleaning agent is used to flush the water provision unit. Preferably, it is provided to carry out first the cleaning operation and subsequently the flushing operation. Then, particularly preferably, the filling operation is carried out so as to fill the water provision unit with water.

BRIEF DESCRIPTION OF THE FIGURES

Below, the invention is explained in further detail in reference to the embodiment examples shown in the drawing, without limiting the invention. The drawing shows.

DETAILED DESCRIPTION

Figure 1:
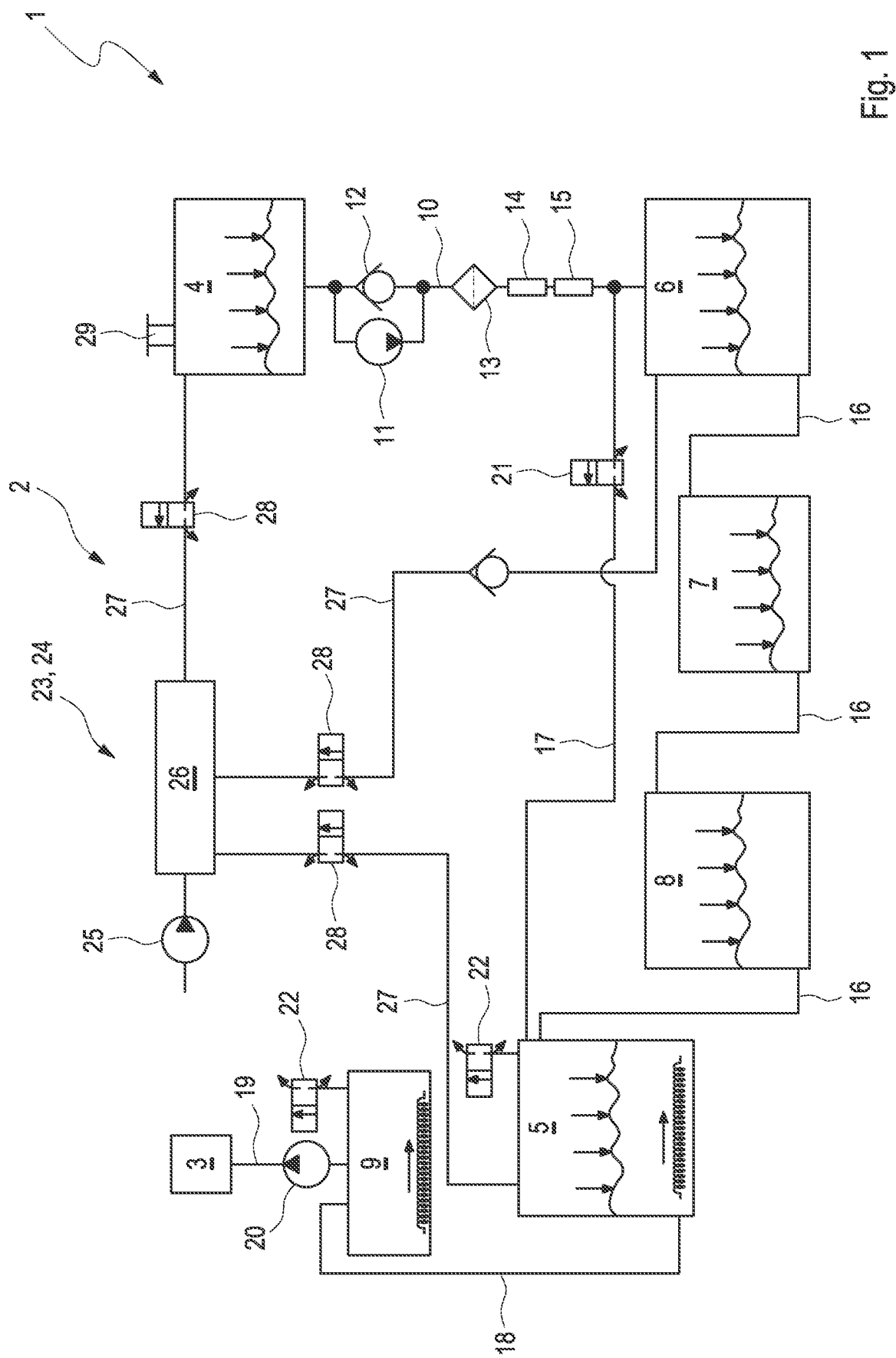
FIG. 1 a diagrammatic representation of a portion of a motor vehicle, which has a water provision unit in a first embodiment, and FIG. 2 a diagrammatic representation of the motor vehicle, wherein the water provision unit is present in a second embodiment.

FIG. 1 shows a diagrammatic representation of a region of a motor vehicle 1, namely a water provision unit 2 and a water consumer 3 of the motor vehicle. The water consumer 3 is present, for example, as cleaning unit or as water injection of a drive device of the motor vehicle 1. The water provision unit 2 is used for the provision of water to the water consumer 3. For this purpose, the water provision unit 2 comprises a water collection tank 4, a primary water tank 5 as well as at least one secondary water tank 6, in the embodiment example represented here, secondary water tanks 6, 7, 8. In addition, the embodiment example of the water provision unit 2 shown comprises a working water tank 9.

The water collection tank 4 is fluidically connected to the secondary water tank 6 via a connection line 10. In the connection line 10, in the example shown, a flushing pump 11 with a parallel connected check valve 12, a filter 13, an ion exchanger 14 and a performance sensor 15 are arranged. The secondary water tanks 6, 7 and 8 are fluidically connected to one another and to the primary water tank 5 in each case via a supply line 16. For example, the supply line 16 located farthest downstream, which starts from the secondary water tank 8, leads into a bypass line 17. The bypass line 17 branches from the connection line 10 and, on its side facing away from the connection line 10, leads into the primary water tank 5. A fluidic connection of the working water tank 9 to the primary water tank 5 is established via a feed line 18.

Moreover, the working water tank 9 is fluidically connected via an extraction line 19 to the water consumer 3. In the extraction line 19, a conveying pump 20 is arranged, which is provided and designed for extracting water from the working water tank 9 and for supplying the extracted water to the water consumer 3. It can be provided that the extraction line 19 and the feed line 18 have the same line cross section. In addition, it can be provided that the connection line 10 also has the same line cross section as the extraction line 19 and the feed line 18. The supply lines 16, on the other hand, are designed with a smaller line cross section, as is preferably the bypass line 17. However, it can be provided that the bypass line 17 between an inlet site of the supply line 16 into the bypass line 17 and the primary water tank 5, has a larger throughflow cross section, in particular the same throughflow cross section as the connection line 10.

With such a design, it is possible, in particular, to supply water through the connection line 10 both to the bypass line 17 and to the supply lines 16, so that, via the bypass line 17 and the supply lines 16, water is or can be conveyed in parallel from the water collection tank 4 into the primary water tank 5. Into the bypass line 17, a switching valve 21 is arranged, by means of which the bypass line 17 can be opened or interrupted as desired. Moreover, fluidically connected to the primary water tank 5 and to the working water tank 9 are venting valves 22 by means of which the respective tank can be vented. The additional tanks can also optionally comprise in each case such a venting valve 22. The venting valves 22 are preferably present as electric or electromagnetic switching valves.

The water provision unit 2 moreover has a water conveying unit 23 which here has an overpressure provision unit 24 with an overpressure pump 25 and with a pressure tank 26. The pressure tank 26 is fluidically connected via overpressure lines 27 in each case to the water collection tank 4, to the secondary water tank 6 and to the primary water tank 5, namely in each case directly connected. An overpressure switching valve 28 is present in each of the overpressure lines 27. By means of the water conveying unit 23, the water present in the water provision unit 2 can be conveyed by means of a gaseous conveyor medium from the water collection tank 4 in direction of the additional tanks. It can be provided that the water collection tank 4 has a connection nozzle 29 which is provided and designed for connecting an external water source to the water collection tank 4. The connection nozzle 29 comprises, for example, a connection for a conventional household hose coupling.

FIG. 2 shows a diagrammatic representation of the vehicle 1, wherein the water provision unit 2 is present in a second embodiment. The second embodiment corresponds at least partially to the first embodiment, so that reference is made to the above explanations and only differences will be addressed below. These differences consist in that the water conveying unit 23, instead of the overpressure provision unit 24, comprises an underpressure pump 30 which is fluidically connected directly to the working water tank 9. By means of the underpressure pump 30, the gaseous conveying medium can be suctioned from the working tank 9, so that a conveying effect on the fluid present in the water provision unit 2 results. The conveying effect of the underpressure pump 30 is assisted by means of a check valve 31 which is present in the feed line 18 and which opens in direction of the working water tank 9.

An additional difference is that an overpressure valve 32 is in each case associated with the secondary water tanks 6, 7 and 8, valve which is present essentially as check valve and which opens in direction of an outside environment of the water provision unit 2. Via the overpressure valves 32, overpressure from the secondary water tanks 6, 7 and 8 can be relieved. In addition, it is provided that the supply lines 16 not only connect the secondary water tanks 6, 7 and 8 to one another and to the primary water tank 5 but, in addition, they lead into the bypass line 17 in each case. Thereby, a targeted supply of water to each of the water tanks 6, 7 and 8 is possible.

In addition to the already mentioned lines, the water provision unit 2 in the second embodiment has a filling line 33 in which a switching valve 34 is preferably present. The filling line 33 connects the working water tank 9 to the connection line 10, namely downstream of the flushing pump 11. Via the filling line 33, by means of the flushing pump 11, a rapid direct filling of the working water tank 9 from the water collection tank 4 can be carried out.

The described design of the motor vehicle 1 and of the water provision unit 2 in the two different embodiments enables a reliable provision of water to the water consumer 3 with simultaneously exceedingly low space requirement.

LIST OF REFERENCE NUMERALS

1 Motor vehicle
2 Water provision unit
3 Water consumer
4 Water collection tank
5 Primary water tank
6 Secondary water tank
7 Secondary water tank
8 Secondary water tank
9 Working water tank
10 Connection line
11 Flushing pump
12 Check valve
13 Filter
14 Ion exchanger
15 Performance sensor
16 Supply line
17 Bypass line
18 Feed line
19 Extraction line
20 Conveying pump
21 Switching valve
22 Venting valve
23 Water conveying unit
24 Overpressure provision unit
25 Overpressure pump
26 Pressure tank
27 Overpressure line
28 Overpressure switching valve 29 Connection nozzle
30 Underpressure pump
31 Check valve
32 Overpressure valve
33 Filling line
34 Switching valve

The invention claimed is:

1. A motor vehicle comprising a water provision unit for providing water to at least one water consumer, the water provision unit comprising:
   a series, fluidic connection of a water collection tank, at least one secondary water tank, a primary water tank, and the at least one water consumer, in that order,
   a connection line which extends between and fluidically connects the water collection tank directly to the at least one secondary water tank,
   a bypass line which extends between and fluidically connects the primary water tank directly to the connection line, and
   a conveying unit which is configured to convey the water from the water collection tank towards the primary water tank via a gaseous conveying medium.

2. The motor vehicle according to claim 1, wherein the primary water tank is fluidically connected directly to the at least one water consumer via an extraction line which has a larger line cross section than the connection line and/or than a supply line via which the primary water tank is fluidically connected directly to the at least one secondary water tank.

3. The motor vehicle according to claim 1, wherein a working water tank is fluidically interposed between the primary water tank and the at least one water consumer.

4. The motor vehicle according to claim 3, wherein the primary water tank is fluidically connected directly to the working water tank via an extraction line which has a larger line cross section than the connection line and/or a supply line via which the primary water tank is fluidically connected to the at least one secondary water tank, and
   wherein the working water tank is fluidically connected to the at least one water consumer via a feed line which has a smaller line cross section than the extraction line.

5. The motor vehicle according to claim 1, wherein the primary water tank is heated and the at least one secondary water tank and the water collection tank are unheated.

6. The motor vehicle according to claim 1, wherein the connection line comprises a filter.

7. The motor vehicle according to claim 1, wherein a switching valve is arranged on the bypass line for controlling flow through the bypass line.

8. The motor vehicle according to claim 1, wherein the conveying unit is an under-pressure pump directly connected to the primary water tank which creates a negative pressure that draws or sucks the water towards the primary water tank.

9. The motor vehicle according to claim 1, wherein the conveying unit is an over-pressure pump directly connected to the water collection tank which creates a positive pressure that pushes the water towards the primary water tank.

10. A method for operating the motor vehicle according to claim 1, comprising:
    conveying the water from the water collection tank towards the primary water tank using the conveying unit.

11. The motor vehicle according to claim 1, wherein the connection line comprises an ion exchanger.

12. The motor vehicle according to claim 1, wherein the connection line comprises a performance sensor.

13. The motor vehicle according to claim 1, wherein the connection line comprises a flushing pump.

14. The motor vehicle according to claim 3, wherein the conveying unit is an under-pressure pump directly connected to the working water tank which creates a negative pressure that draws or sucks the water towards the working water tank.

15. The motor vehicle according to claim 1, wherein the conveying unit is an over-pressure pump directly connected to one or more of the at least one secondary water tank which creates a positive pressure that pushes the water towards the primary water tank.

16. The motor vehicle according to claim 1, wherein the conveying unit is an over-pressure pump directly connected to each of the water collection tank, the at least one secondary water tank, and the primary water tank which creates a positive pressure that pushes the water towards the primary water tank.

17. The motor vehicle according to claim 1, wherein the at least one water consumer comprises a water injector for a drive unit of the motor vehicle.

18. The motor vehicle according to claim 1, wherein the at least one water consumer comprises a windshield cleaning unit of the motor vehicle.

19. The motor vehicle according to claim 3, wherein a conveying pump, separate from the conveying unit, is fluidically arranged between the working water tank and the at least one water consumer and is configured to pump water from the working water tank into the at least one water consumer.

20. The motor vehicle according to claim 3, wherein one or more of the primary water tank and the at least one secondary water tank are provided with overpressure valves.

* * * * *